United States Patent
Lin et al.

(10) Patent No.: US 8,233,291 B2
(45) Date of Patent: Jul. 31, 2012

(54) SINGLE STAGE AC TO DC CONVERSION DEVICE WITH COMPACT CONFIGURATION

(75) Inventors: Shian-Nan Lin, Tainan County (TW); Wen-Lung Wu, Changhua County (TW)

(73) Assignee: Gio Optoelectronics Corp., Tainan County (TW)

( * ) Notice: Subject to any disclaimer, the term of this patent is extended or adjusted under 35 U.S.C. 154(b) by 522 days.

(21) Appl. No.: 12/470,584

(22) Filed: May 22, 2009

(65) Prior Publication Data

US 2009/0296440 A1 Dec. 3, 2009

(30) Foreign Application Priority Data

May 30, 2008 (TW) ................................ 97120299 A

(51) Int. Cl.
*H02M 3/335* (2006.01)
(52) U.S. Cl. .................................. 363/21.08; 363/21.16
(58) Field of Classification Search ............... 363/21.08, 363/21.16
See application file for complete search history.

(56) References Cited

U.S. PATENT DOCUMENTS

| | | | | |
|---|---|---|---|---|
| 5,602,726 A | * | 2/1997 | Sakai | 363/55 |
| 5,973,941 A | * | 10/1999 | Zaim | 363/21.08 |
| 6,081,438 A | * | 6/2000 | Saint-Pierre et al. | 363/95 |
| 2004/0252528 A1 | * | 12/2004 | Kuwabara | 363/21.07 |
| 2005/0099828 A1 | | 5/2005 | Cheng et al. | |

FOREIGN PATENT DOCUMENTS

| | | |
|---|---|---|
| JP | 61207172 A | 9/1986 |
| JP | 2005-151608 A | 6/2005 |
| TW | M329290 U | 10/1996 |

* cited by examiner

*Primary Examiner* — Adolf Berhane
*Assistant Examiner* — Gary Nash
(74) *Attorney, Agent, or Firm* — Birch, Stewart, Kolasch & Birch, LLP

(57) ABSTRACT

A single-stage AC to DC conversion device includes an energy storage unit, a magnetic unit, and a switch unit. The magnetic unit electrically connects the energy storage unit with the switch unit, and has a core, a first winding, a second winding, a third winding, and at least one output winding. The first winding couples with the core and transfers a first electric energy to the core. The second winding couples with the core and stores a second electric energy in the energy storage unit. The third winding couples with the core and transfers the second electric energy to the core. The output winding couples with the core that transfers the first electric energy and the second electric energy, and outputs a third electric energy through the output winding.

10 Claims, 4 Drawing Sheets

SINGLE STAGE AC TO DC CONVERSION DEVICE WITH COMPACT CONFIGURATION

CROSS REFERENCE TO RELATED APPLICATIONS

This Non-provisional application claims priority under 35 U.S.C. §119(a) on Patent Application No(s). 097120299 filed in Taiwan, Republic of China on May 30, 2008, the entire contents of which are hereby incorporated by reference.

BACKGROUND OF THE INVENTION

1. Field of Invention

The present invention relates to a conversion device and, in particular, to a single-stage AC to DC conversion device.

2. Related Art

The power factor is defined as the ratio of the real power to the apparent power, or represents the cosine of the phase angle formed by the voltage waveform and the current waveform. The power factor is between 0 and 1, which means, the load on the circuit is a resistive load, a capacitive load, or an inductive load.

Idealistically, the power factor equals to 1, which means the load on the circuit is purely a resistive load and the voltage waveform representing the load has the same phase with the current waveform. When the power factor is not equal to 1, which means the load on the circuit is a capacitive load or an inductive load, such that a part of the apparent power is converted into the real power and another part of the apparent power is converted into a reactive power. The real power is the power consumption occurred by completing the actual operation of the load, for example, the power consumed to activate a motor. The reactive power is the energy consumption occurred by completing the actual operation of the load.

To reduce the energy consumption occurred by the reactive power, the prior art is to provide an AC to DC conversion circuit. FIG. 1 is a schematic view of a conventional AC to DC conversion circuit 1. With reference to FIG. 1, the conventional AC to DC conversion circuit 1 includes an AC power supply 16, a full-bridge rectifier 11, a first transformer 12, a second transformer 13, and a switch 14. The first transformer 12 is electrically connected to the full-bridge rectifier 11 and the second rectifier 13. The switch 14 is electrically connected to the second transformer 13.

The AC power supply 16 outputs an AC signal S01 to the full-bridge rectifier 11 that outputs a DC signal S02 according to the AC signal S01 and sends the DC signal S02 to the first transformer 12. The first transformer 12 receives the DC signal S02 and the second transformer 13 outputs a DC signal S03 to the load 15 according to the DC signal S02 and the on or off status of the switch 14.

The conventional AC to DC conversion circuit 1 processes the signal conversion through the first transformer 12 and the second transformer 13. However, after operating two transformers, the conversion loss will occur twice.

In addition, the current electronic devices tend to be lighter, thinner, shorter, and smaller in size. The number of elements may be decreased if the first transformer 12 and the second transformer 13 are integrated into one element, such that the electronic device may be smaller or lighter and the conversion loss may be reduced, so as to lower the production cost and enhance the efficiency. Thus, it is an important subject to provide the single-stage AC to DC conversion device that can reduce the number of elements and decrease the conversion loss of the energy.

SUMMARY OF THE INVENTION

In view of the foregoing, the present invention is to provide a single-stage AC to DC conversion device that may reduce the number of the elements and lower the energy consumption while converting.

To achieve the above, the present invention discloses a single-stage AC to DC conversion device that includes an energy storage unit, a magnetic unit, and a switch unit. The magnetic unit electrically connects the energy storage unit with the switch unit and includes a core, a first winding, a second winding, a third winding, and at least one output winding. The first winding is coupled with the core and transfers a first electric energy to the core. The second winding is coupled with the core and stores a second electric energy in the energy storage unit. The third winding is coupled with the core and transfers the second electric energy to the core. The output winding is coupled with the core that transfers the first electric energy and second electric energy, and outputs a third electric energy through the output winding.

As mentioned above, the single-stage AC to DC conversion device of the present invention is to couple the first winding, second winding, third winding, and output winding with the same core. Compared to the prior art, the single-stage AC to DC conversion device uses only one magnetic unit. Thus other than reducing the energy consumption while converting, the single-stage AC to DC conversion device may further save the space and lower the production cost.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
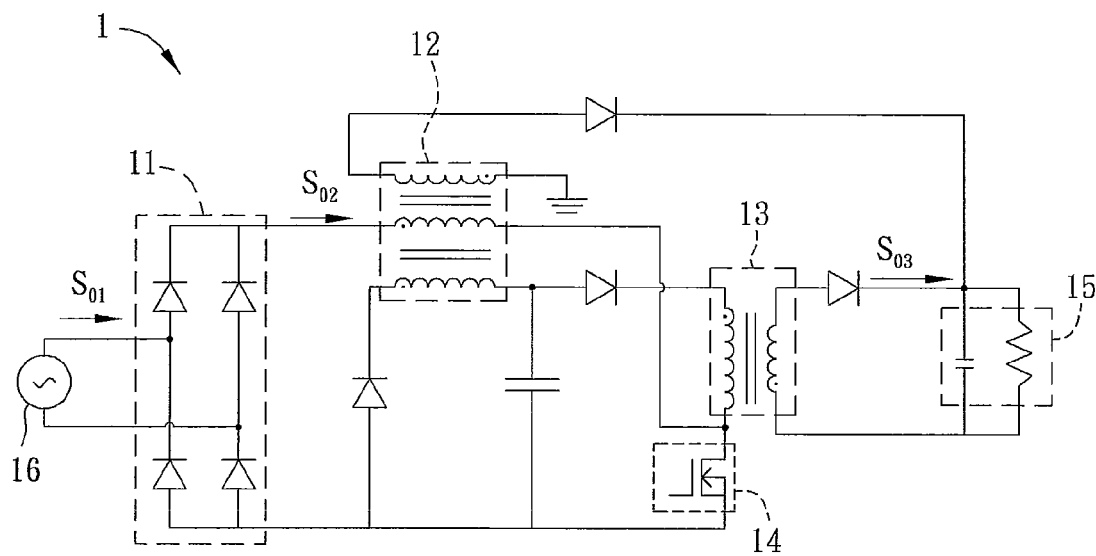
FIG. 1 is a schematic view of a conventional AC to DC conversion device.
Figure 2:
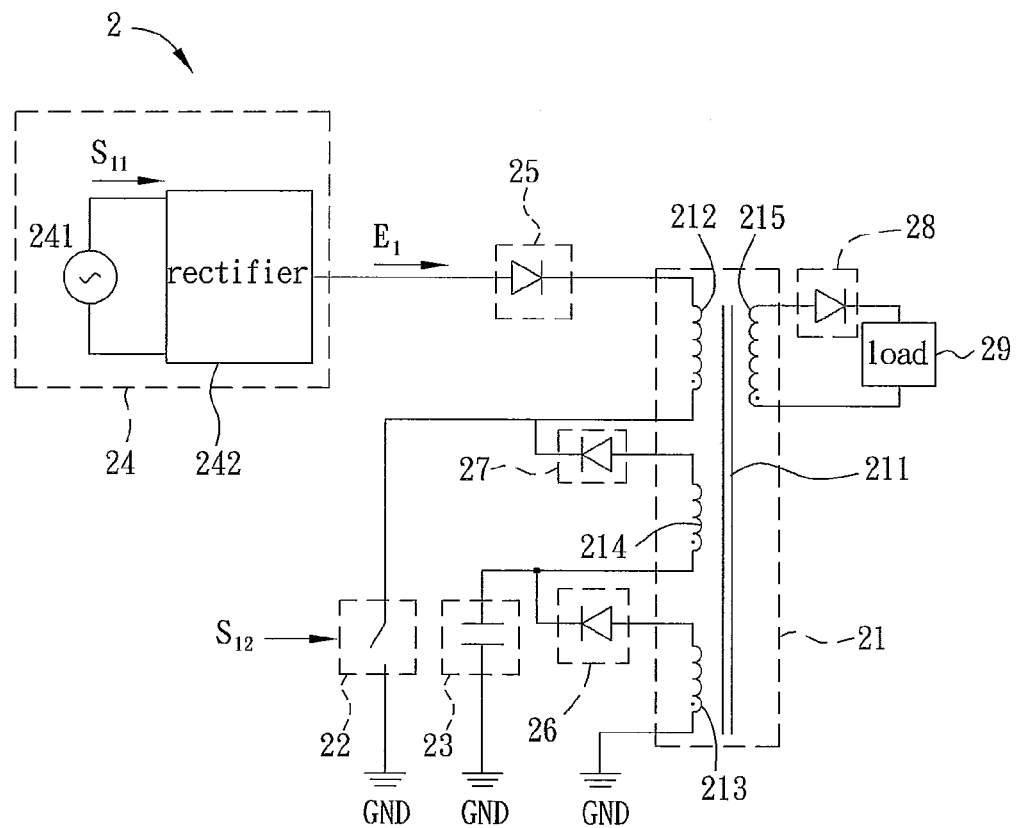
FIG. 2 is a schematic view of a single-stage AC to DC conversion device according to a preferred embodiment of the present invention.

FIG. 2 is a schematic view of a single-stage AC to DC conversion device 2. With reference to FIG. 2, the single-stage AC to DC conversion device 2 includes a magnetic unit 21, a switch unit 22, and an energy storage unit 23. The magnetic unit 21 electrically connects the switch unit 22 with the energy storage unit 23. The embodiment further includes a power supply unit 24 that is electrically connected to the magnetic unit 21.

The magnetic unit 21 includes a core 211, a first winding 212, a second winding 213, a third winding 214, and at least one output winding 215. The first winding 212, second winding 213, third winding 214, and output winding 215 are coupled with the core 211, respectively. In the embodiment, the first winding 212, second winding 213, third winding 214, and output winding 215 may be wound around the core 211. The aspects of the core 211 may be, for example but not limited to, an E-shape core, a U-shape core, or an I-shape core.

The switch unit 22 may be turned on or off in accordance with the switching signal S12 transmitted from a switching signal line, so as to control the first winding 212 and the third winding 214 to store the energy in the core 211, or to control the core 211 for releasing the energy to the second winding 213 and output winding 215. In operation, the switching signal S12 may be a pulse width modulation (PWM) signal, for example, an analog signal or a digital signal; and may be generated by a microcontroller unit. In the embodiment, the switch unit 22 may be a three-terminal element such as a transistor.

In addition, the single-stage AC to DC conversion device 2 further includes a first rectifying unit 25, a second rectifying unit 26, and a third rectifying unit 27. The first rectifying unit 25 electrically connects the first winding 212 with the power supply unit 24. The second rectifying unit 26 electrically connects the second winding 213 with the energy storage unit 23. The third rectifying unit 27 electrically connects the first winding 212 with the third winding 214.

Nevertheless, the ways of connection between the second rectifying unit 26 and the third rectifying unit 27 are not limited in the embodiment. Those skilled in the art may use the second rectifying unit 26 for electrically connecting the second winding 213 and the ground GND, or use the third rectifying unit 27 for electrically connect the third winding 214 and the energy storage unit 23 to achieve the same result. In practice, the first rectifying unit 25, second rectifying unit 26, and third rectifying unit 27 may include a diode, respectively.

Please refer to FIG. 2, the power supply unit 24 includes an AC power supply 241 and a rectifier 242. The rectifier 242 is electrically connected to the magnetic unit 21. The AC power supply 241 outputs an AC signal S11 to the rectifier 242 that outputs a first electric energy E1 according to the AC signal S11. In the embodiment, the rectifier 242 may be a half-bridge rectifier or a full-bridge rectifier.

Figure 3:
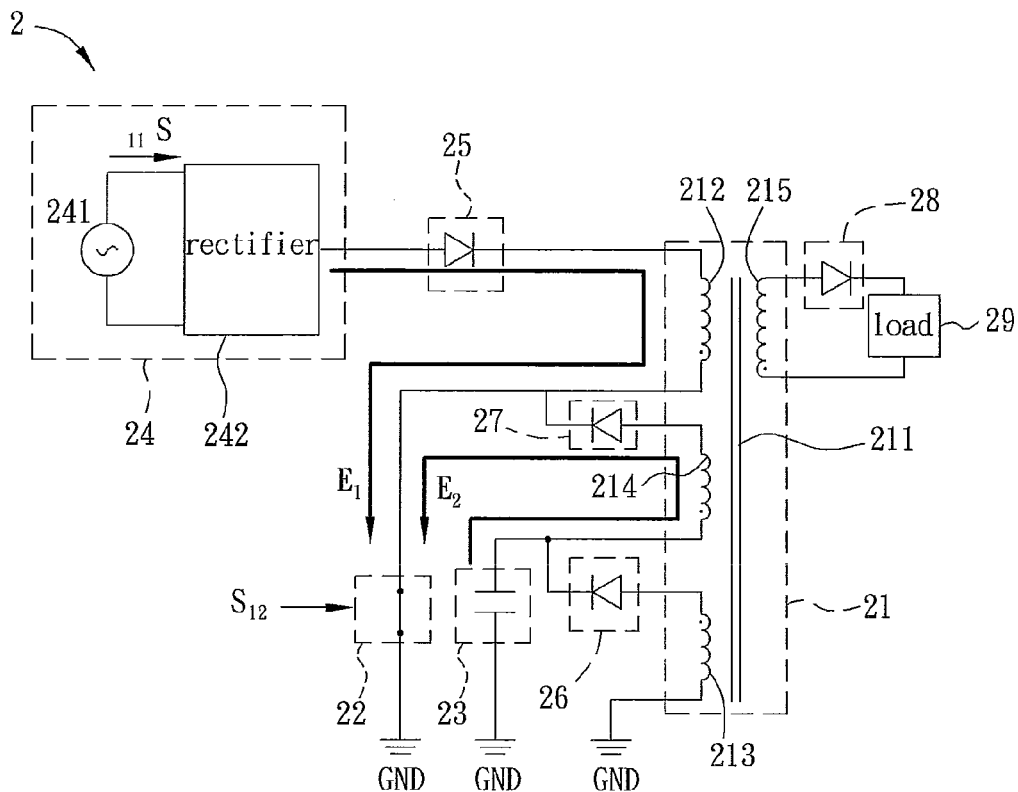
FIGS. 3 and 4 are schematic views of the single-stage AC to DC conversion device in operation according to the preferred embodiment of the present invention.

FIG. 3 shows the operation of the single-stage AC to DC conversion device 2. With reference to FIG. 3, when the switch unit 22 is turned on through the switching signal S12 transmitted by the switching signal line and the power supply unit 24 outputs a first electric energy E1, the power supply unit 24, first rectifying unit 25, first winding 212, and switch unit 22 form a circuit, such that the first winding 212 transfers the first electric energy E1 to the core 211. Additionally, the energy storage unit 23, third winding 214, third rectifying unit 27, and switch unit 22 form a circuit, such that the third winding 214 transfers a second electric energy E2 to the core 211.

Figure 4:
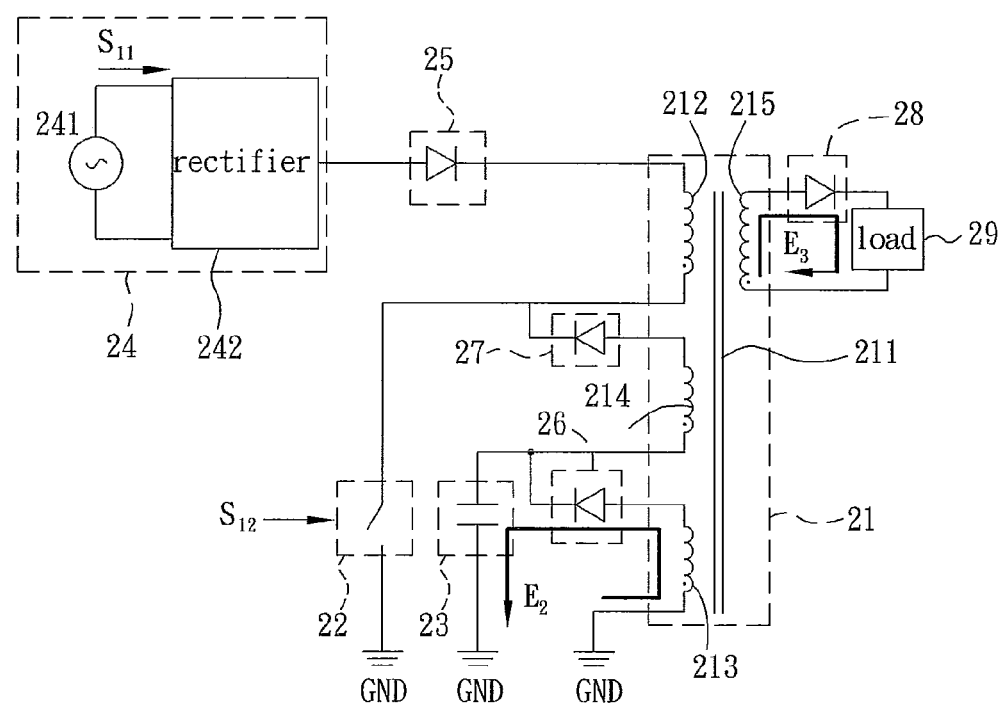

FIG. 4 is a schematic view of the single-stage AC to DC conversion device 2 in operation. With reference to FIG. 4, when the switch unit 22 is turned off through the switching signal S12 transmitted by the switching signal line, the first winding 212 and the third winding 214 stop transferring the first electric energy E1 and the second electric energy E2, respectively.

Meanwhile, the second winding 213, second rectifying unit 26, and energy storage unit 23 form a circuit. Thus, the core 211 may release the energy to the second winding 213, so the second winding 213 may store the second electric energy E2 in the energy storage unit 23. Furthermore, the output winding 215, a fourth rectifying unit 28 and a load 29 form a circuit. Thus, the core 211 may release the energy to the output winding 215, so the fourth winding 215 outputs a third electric energy E3 to the load 29.

In short, in the above-mentioned operation, when the switch unit 22 is turned on, the first winding 212 and the third winding 214 transfer and store the electric energy to the core 211 in form of magnetic energy. When the switch unit 22 is turned off, the core 211 transfers the stored magnetic energy to the second winding 213 and output winding 215 for outputting in form of electricity.

In the embodiment, the energy storage unit 23 may include a capacitor, and the load 29 may be a DC load such as an LED or a microprocessor.

Additionally, in the above-mentioned structure, the energy storage unit 23 may release the stored electric energy when the AC power 241 stops outputting the AC signal S11 in a short period of time, in order to keep providing the needed electric energy to the load during a hold-up time.

Moreover, in the embodiment, the single-stage AC to DC conversion device 2 may operate in a continuous-current-conduction mode or a discontinuous-current-conduction mode according to different control modes in this structure.

Figure 5A:
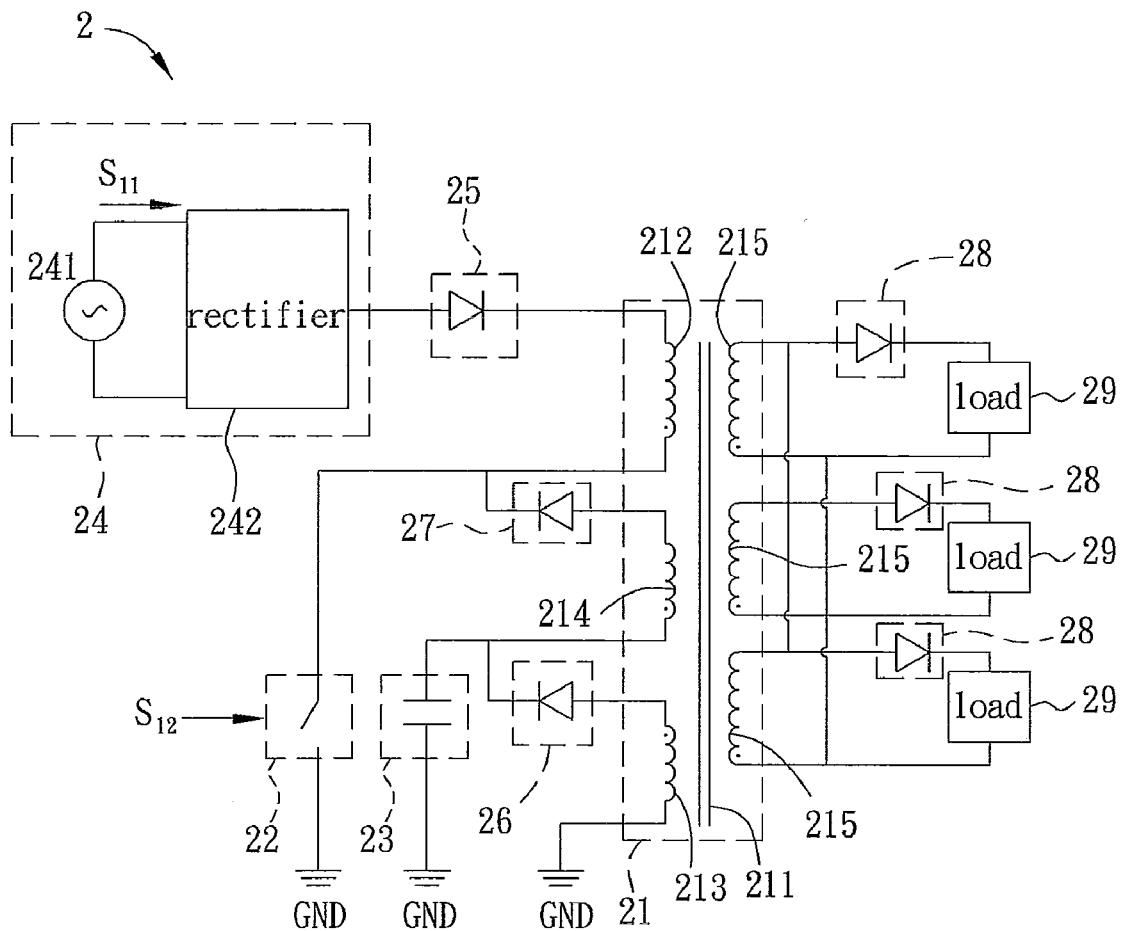
FIGS. 5A to 5C are schematic views of the single-stage AC to DC conversion device in different aspects according to the preferred embodiment of the present invention.
Figure 5B:
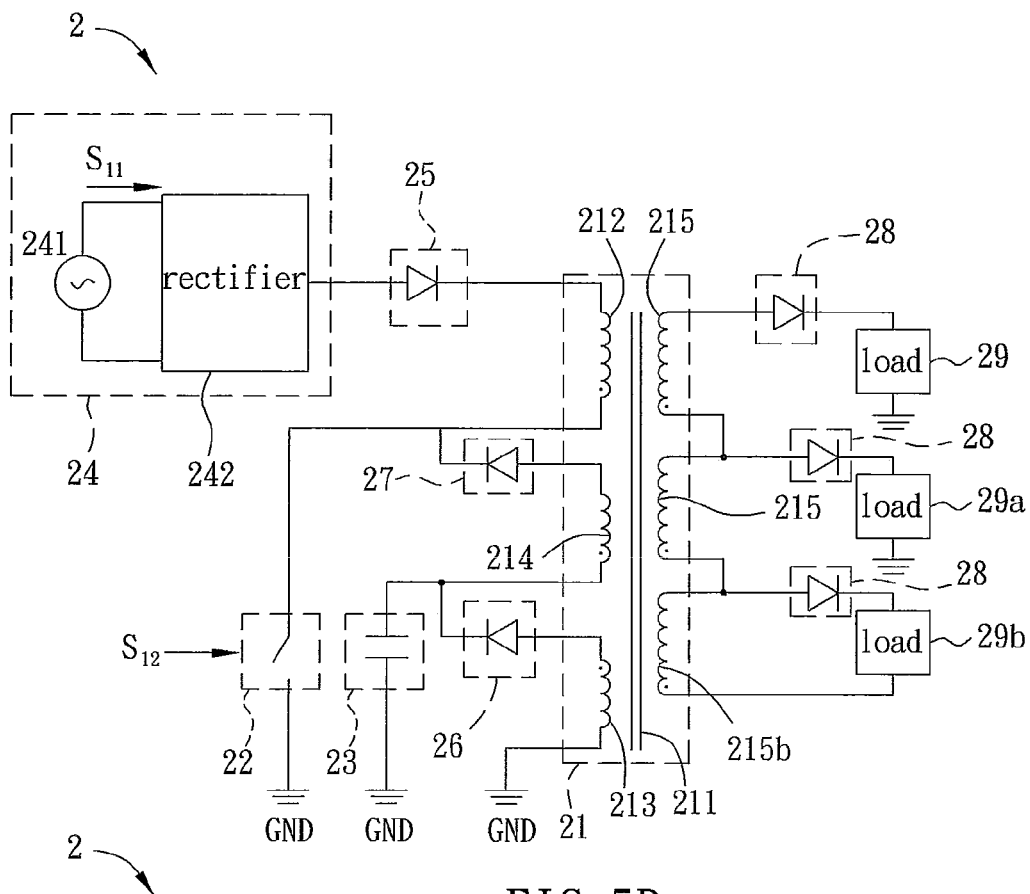
Figure 5C:
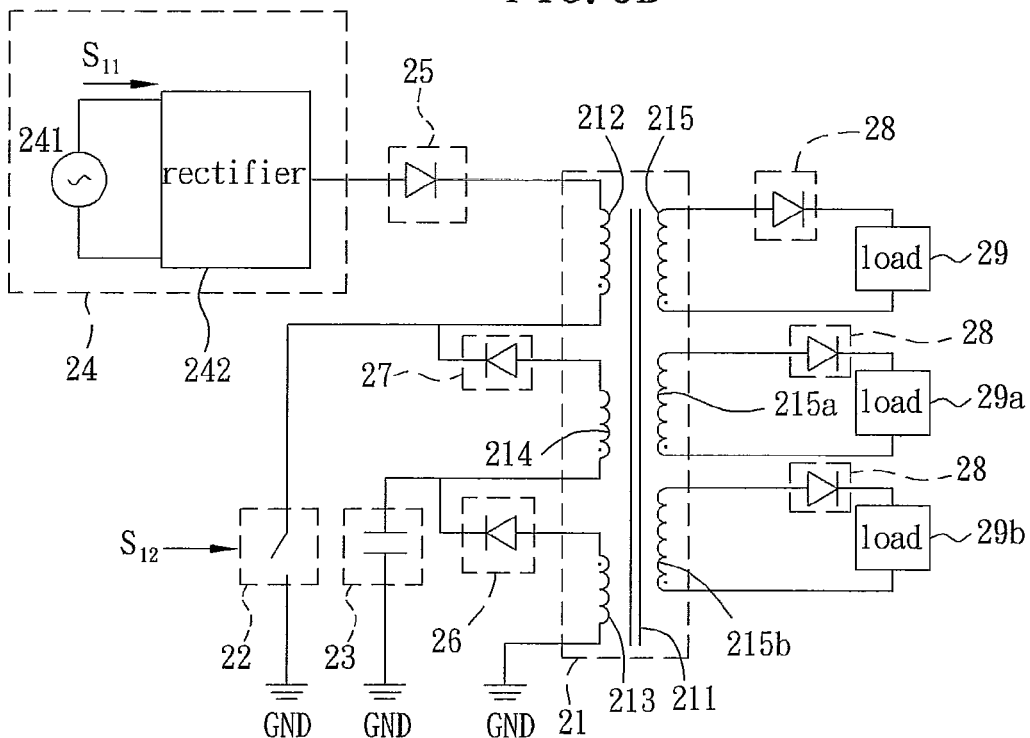

FIGS. 5A to 5C are schematic views of the single-stage AC to DC conversion device 2 in different aspects. Please refer to FIG. 5A, the magnetic unit 21 may also include a plurality of output windings 215 that are connected to each other. Each output winding 215 is coupled with the core 211 and drives the load 29. However, each output winding is not limited to have the same number of loops in the embodiment. The user may design the output windings with different numbers of loops for driving different kinds of loads depending on the demands, but it is not limited to this.

As shown in FIG. 5B, the magnetic unit 21 of the embodiment may include a plurality of output windings 215, 215a, and 215b that are connected to each other. The output windings 215, 215a, and 215b are coupled with the core 211 and drive the corresponding loads 29, 29a, and 29b, respectively. As shown in FIG. 5C, the magnetic unit 21 may also include a plurality of output windings 215, 215a, and 215b that are coupled with the core 211, respectively, and drive the corresponding loads 29, 29a, and 29b. It is known to those skilled in the art that each output winding in FIG. 5B may have the same number of loops as that in FIG. 5C and each output winding may further drive the same load but is not limited to this.

To sum up, the single-stage AC to DC conversion device of the present invention is to wind the first winding, second winding, third winding, and output winding around the same core. Compared to the prior art, the single-stage AC to DC conversion device only uses a magnetic unit. Hence, other than decreasing the energy consumption while converting, the single-stage AC to DC conversion device may also save spaces and reduce the production cost. Furthermore, the single-stage AC to DC conversion device of the present invention may provide the load with the third electric energy having a low ripple voltage through the energy storage unit. In addition, the energy storage unit of the present invention may also provide the single-stage AC to DC conversion device with enough hold-up time, which is, in a short period of time, when the AC signal stops transferring into the rectifier, the required electric energy provided to the load by the energy storage unit can maintain the regular operation of the load.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A single-stage AC to DC conversion device comprising:
an energy storage unit;
a magnetic unit electrically connected to the energy storage unit, comprising:
a core;
a first winding coupled with the core and transferring a first electric energy to the core;
a second winding coupled with the core and storing a second electric energy in the energy storage unit;
a third winding coupled with the core and transferring the second electric energy to the core; and
at least one output winding coupled with the core, wherein the core converts the first electric energy and the second electric energy, and outputs a third electric energy through the output winding; and
a switch element electrically connected to the magnetic unit and operated selectively to control the first winding and the third winding to store the energy in the core or to control the core for releasing the energy to the second winding and output winding.

2. The single-stage AC to DC conversion device according to claim 1, wherein the first winding, the second winding, the third winding, and the output winding are wound around the core.

3. The single-stage AC to DC conversion device according to claim 1, further comprising: a power supply unit electrically connected to the magnetic unit and outputting the first electric energy.

4. The single-stage AC to DC conversion device according to claim 3, further comprising: a first rectifying unit connected to the first winding and the power supply unit.

5. The single-stage AC to DC conversion device according to claim 3, wherein the power supply unit comprises a rectifier for outputting the first electric energy according to an AC power.

6. The single-stage AC to DC conversion device according to claim 1, wherein the switch unit controls the first winding and the third winding to store the energy in the core, or controls the core for releasing the energy to the second winding and the output winding.

7. The single-stage AC to DC conversion device according to claim 1, further comprising:
a second rectifying unit electrically connected to the second winding and the energy storage unit; and
a third rectifying unit electrically connected to the first winding and the third winding.

8. The single-stage AC to DC conversion device according to claim 1, wherein when the magnetic unit comprises a plurality of output windings, the output windings are coupled with the core, respectively.

9. The single-stage AC to DC conversion device according to claim 8, wherein the output windings are connected to each other in series or in parallel.

10. The single-stage AC to DC conversion device according to claim 1, wherein:
the switch element is electrically connected with the first winding and one end of the third winding, and
the other end of the third winding is electrically connected with the energy storage unit and the second winding.

* * * * *